Nov. 22, 1966    C. H. SAVIT    3,287,691
HYDROPHONE CABLE
Filed Sept. 10, 1964    2 Sheets-Sheet 2
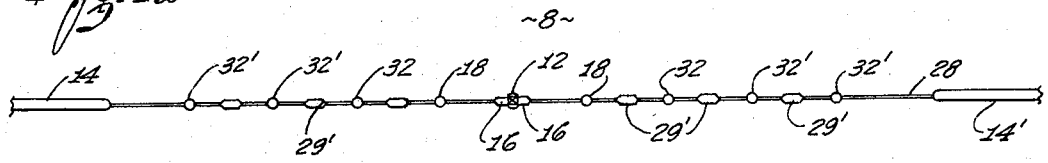
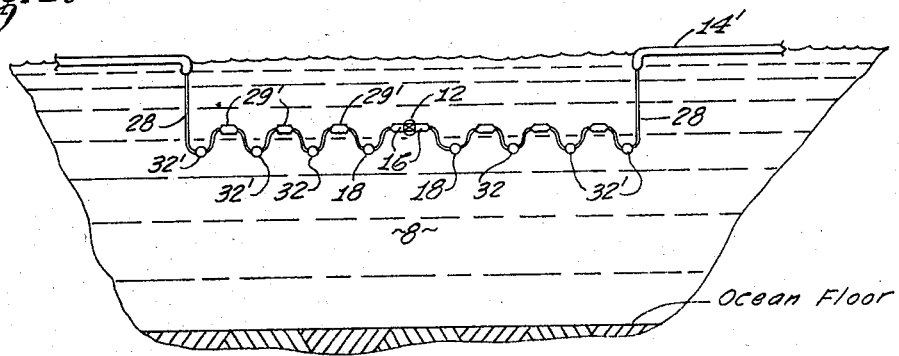
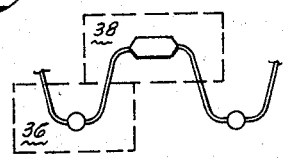
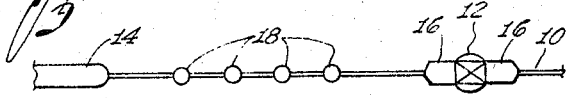
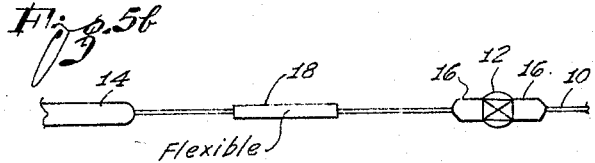
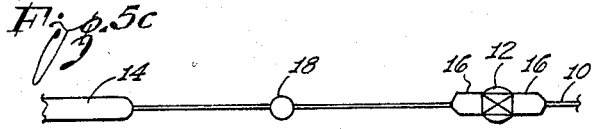
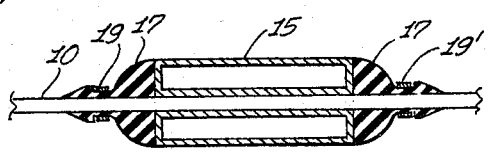
INVENTOR.
Carl H. Savit
By Donald J. Shields
Attorney

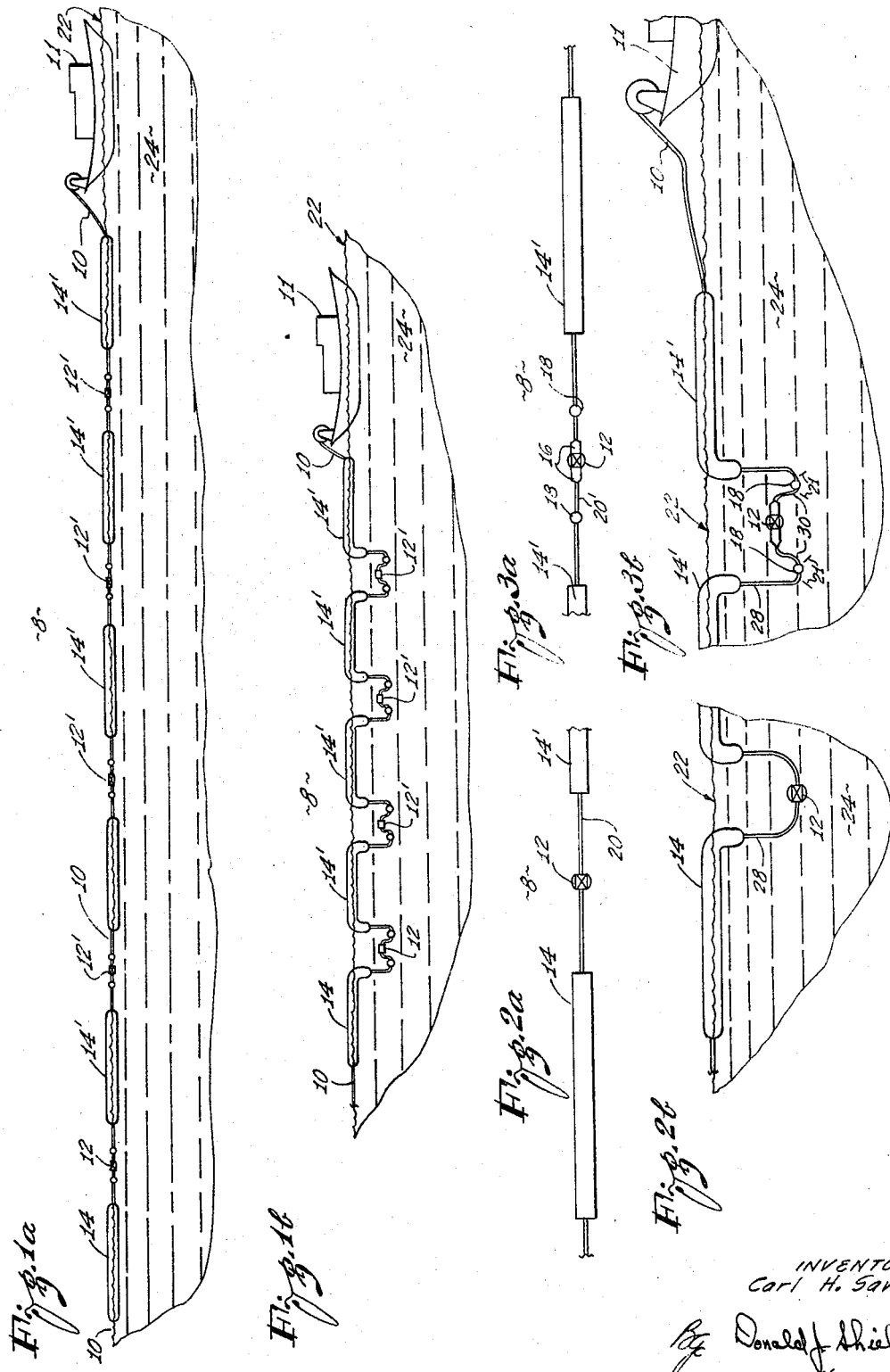

United States Patent Office 3,287,691
Patented Nov. 22, 1966

3,287,691
HYDROPHONE CABLE
Carl H. Savit, Van Nuys, Calif., assignor to Western Geophysical Company of America, Los Angeles, Calif.
Filed Sept. 10, 1964, Ser. No. 395,539
1 Claim. (Cl. 340—7)

This invention relates to marine seismography, and more particularly, to an easily towable and relatively noise-free hydrophone suspension system for use in marine seismography.

In marine seismic surveying, it is customary to tow an array of hydrophone groups behind a ship, to stop the ship at a predetermined position, to detonate an explosive charge or otherwise initiate a seismic shock at a predetermined point, and to record disturbances produced by the shot or shock and detected by the hydrophone groups by means of a recording device on the tow ship.

In a typical operating system employing such a technique, a number of hydrophones are attached to a cable which is towed through the water by a recording vessel. Cables as much as two miles in length with twenty-four hydrophone groups distributed along their length may be used. With such a system, each shot produces twenty-four records of the reflections of the seismic shock from the subsurface geological formations disposed beneath the surface of the water. This permits the determination of the slope or tilt of the formations along the line of the cable, as disclosed, for example, in Booth B. Strange Patent No. 3,133,262, granted May 12, 1964.

It is old in the art to use a variety of hydrophone detector and cable suspension arrangements, all of which are designed to permit ease of towing and reeling by the ship and to allow the hydrophones to reach a preselected equilibrium depth below the surface of the water immediately after the towing ship stops and slacks off on the cable.

The primary requirements of such hydrophone suspension arrangements are low towing friction, freedom from twisting and tangling, ease of reeling off and on ship, accurate and reliable attainment of hydrophone equilibrium depths, and high degree of elimination of surface noise at the hydrophone detector group.

It has previously been proposed to use various arrangements for towing a group of spaced hydrophones. In early attempts to space a string of hydrophones for this type of seismic surveying, it was found that hydrophones which were located at the surface of the water gave unsatisfactory results because of the surface noises generated by wave action and by the cable slap on the waves. It was understood that to get satisfactory results from a cable with spaced hydrophone groups distributed along its length, it was necessary that the hydrophones be in a predetermined depth zone below the surface of the water.

An early system utilized a nonfloatable, unitary tow cable which was kept in a horizontal position beneath the surface of the water by the velocity of the towing ship. However, systems of this type required that the tow ship be in motion during the recording process to keep the cable in a horizontal attitude, and this caused undesirable noise interference from the ship's motion and propellers. It was also found difficult to apply this system to long cables. Other prior art arrangements included a buoyant towing cable and various methods of suspending the hydrophone groups from the buoyant towing cable so that they would remain suspended a predetermined distance beneath the surface of the water and in proper horizontal relationship to each other after the tow ship stopped its motion.

These suspension methods, of necessity, employed some form of branch cables which hung vertically from the buoyant cable to suspend the hydrophone members. Improved versions connected the hydrophone groups to prevent tangling and random motion. These dual cable prior art arrangements utilizing a separate buoyant tow cable were difficult to reel aboard ship and were in general subject to tangling, although some arrangements were more subject to tangling than others. These arrangements also were characterized by a high drag resistance because of the branch cable type configuration. This, of course, reduced the ship's speed and increased operating costs. It also increased the difficulty of reeling the cable aboard ship.

A satisfactory unitary cable would have many advantages over the prior multiple member cables since it would offer a greatly decreased drag resistance if a streamlined form were used and it would also be immeasurably easier to reel aboard a ship. The possibilities of tangling with ordinary handling would be reduced to nil. However, in the past unitary cables have not proved practical because it has not been possible to use them to suspend hydrophones at a predetermined depth with the assurance that the hydrophones will remain at a predetermined depth when the motion of the boat is stopped, and it has not been possible to suspend the cables at a predetermined depth with the assurance that the entire cable will not sink down to greater depths where it will be lost or destroyed.

An object of the present invention is to facilitate towing and reeling by a ship of hydrophone groups and cable used in marine seismic surveying.

Another object is to isolate the hydrophone groups recording seismic shock from interfering noise signals caused by surface wave motion while keeping the hydrophones at a preselected depth beneath the surface of the water to detect the maximum seismic signals.

A further object of the present invention is to provide a unitary hydrophone detector and cable combination in which the cable will be floatable and flexible enough to conform to the shape of surface waves and yet will not be subject to sinking because of the effects of hydrostatic pressure on the cable.

An additional object of the present invention is to provide a unitary hydrophone cable which will suspend a string or spread of hydrophones spaced along its length at a predetermined depth below the surface when the tow ship is not moving.

A further object of the present invention is to provide a hydrophone cable which will reliably suspend a string of hydrophones at a predetermined depth and will be easily towable by a ship as well as being easy to reel aboard ship without tangling.

In accordance with an illustrative embodiment of the invention, a unitary multiconductor hydrophone cable achieves equilibrium with the hydrophone groups at a preselected depth beneath the surface of the water by means of integrally connected hydrophones and weights located to form selected sinkable cable sections having a negative buoyancy which varies in magnitude along said sections. This negative buoyancy is balanced by discrete flexible floatable covering segments spaced from the hydrophones and encasing the cable with sufficient positive buoyancy to impart a net positive buoyancy to the system as a whole. This system isolates the hydrophones from surface noise signals by means of mechanical filter sections formed between the hydrophones beneath the surface and the portions of the cable which are caused to float at the surface by the encasing flotation segments. In a preferred arrangement, these filter sections include fully waterproof, non-absorptive and relatively incompressible buoyant elements interspaced with additional integral weights along the sinkable cable sections.

A feature of the present invention contemplates an integration of the hydrophone groups into a unitary cable to facilitate towing and reeling by the tow ship. In accordance with an important feature of the present invention, a flexible floatable cover encases portions of the hydrophone cable and permits these portions of the cable to conform to the surface wave shapes while floating on the surface of the water. Still another feature contemplates waterproof non-absorptive buoyant elements located adjacent the hydrophones. These elements are constructed so as to be substantially incompressible by hydrostatic pressures at depths in the operating range of the hydrophone groups. These and similar buoyant elements disposed along the uncovered portions of the cable in combination with weights may be used to create mechanical filters which will isolate the hydrophones from surface noise.

Hydrophone cables embodying the unique features described herein are characterized by ease of towing and reeling, are not subject to tangling, and they suspend the hydrophone groups at preselected depths without the danger of the entire cables sinking. They provide low surface noise because of the flexibility and pliability of the floating sections, and they provide a high signal-to-surface-noise ratio at the hydrophone groups because of the mechanical filtering provided by the buoyant elements and weights.

The novel features which are believed to be characteristic of the invention both as to its organization and method of construction and operation, together with further objects and advantages thereof, will be better understood from the following description, considered in connection with the accompanying drawing in which illustrative embodiments of the invention are disclosed by way of example. It is to be expressly understood that the drawing is for the purposes of illustration and description only and does not constitute a limitation of the invention.

In the drawing:

FIG. 1a is a view in elevation illustrating a hydrophone and cable assembly in accordance with the invention being towed by a tow ship;

FIG. 1b is a view in elevation of the embodiment of FIG. 1a, illustrated in its operating position;

FIG. 2a is a view in elevation of a simple embodiment of the present invention;

FIG. 2b is a view in elevation of the embodiment shown in FIG. 2a illustrated in its operating position;

FIG. 3a is a view in elevation of a filtered embodiment of the present invention;

FIG. 3b is a view in elevation of the embodiment shown in FIG. 3a illustrated in its operating position;

FIG. 4a is a view in elevation of a multiple filter embodiment of the present invention;

FIG. 4b is a view in elevation of the embodiment shown in FIG. 4a illustrated in its operating position;

FIG. 4c illustrates the cable sections comprising a mechanical filter in an illustrative embodiment;

FIGS. 5a, 5b, and 5c are views in elevation illustrating the various weighting means which may be used in connection with the present invention; and FIG. 6 shows the construction of a typical buoyant element.

Referring now to the drawings wherein like reference characteristics designate the same parts through the several views, there is shown in the figures several embodiments of a hydrophone suspension system 8 in accordance with the present invention. As shown in FIGS. 1a and 1b, the apparatus may include a hydrophone cable 10 of the conventional multi-conductor insulated type having stress properties making it suitable for towing, as by a ship 11. The cable 10 per se, without flotation elements, should have a negative buoyancy and to achieve this, it may either have an inherent density greater than that of water or it may be loaded or weighted to achieve such density by lead weights or other means well known in conventional practice in order to make it heavier than water.

An object described as having positive buoyancy is defined for the purposes of this specification as having a density less than that of the fluid in which it is wholly or partially immersed so that the upward buoyant force exerted on the object by the liquid tending to force it toward the surface of the fluid is greater than the downward gravitational force on the object. Therefore, the object has a tendency to float.

An object described as having negative buoyancy is defined for the purposes of this specification as having a density greater than that of the fluid in which it is wholly or partially immersed so that the downward gravitational force on the object is greater than the buoyant upward force exerted on the object by the liquid tending to force it toward the surface. Therefore, the object has a tendency to sink.

A plurality of hydrophones 12, 12' of conventional design are integrally connected to the cable in spaced relationship along its length. Floatable cable covering segments 14, 14' having a positive buoyancy encase the cable between the hydrophones except for a distance on each side of the hydrophones which is slightly greater than the preselected operating depth of the hydrophones. These floatable segments are provided with a fully waterproof non-absorptive covering such as a rubber or a plastic cover, and they may be filled with air or oil or a cellular material such as sponge rubber or flexible plastic foam so that they have sufficient positive buoyancy to support additional weight while floating. For example, sponge segments could be placed along the cable and sealed to present a waterproof surface, or flexible pliable plastic foam could be used utilizing a plastic or rubber waterproof coating. Other materials, of course, may be used for waterproofing and obtaining flotation. The floatable cable covering segments 14, 14' are sufficiently buoyant to support the entire hydrophone suspension system when the floatable cable covering segments 14, 14' themselves float at the surface 22 of the fluid 24.

As shown in FIGS. 2a and 2b, the sections of the cable which contain the hydrophones are located between the floatable cable covering segments 14, 14'. These sections are referred to herein as sinkable cable sections 20, 20'. For some applications the weight of the cable itself and the hydrophones will provide sufficient negative buoyancy for the operation of the system. In other applications a weight or plurality of weights 18, 18' must be located on the sinkable cable sections 20, 20' so as to achieve the correct equilibrium depth of the hydrophones 12, 12' under operating conditions. See the embodiment shown in FIGS. 3a and 3b. These weights 18, 18' should be integrally affixed to the cable by conventional methods. Several methods for affixing the weights are shown in FIGS. 5a, 5b and 5c. FIG. 5a shows several small weights. FIG. 5b shows a single elongated flexible weight such as a tube of sand, mercury, or metal powder. FIG. 5c shows a single weight which may be hydrodynamically shaped to reduce drag if desired. However, the positioning on the cable may be made adjustable so that the equilibrium depth of the hydrophones may be adjusted. The small fraction of the cable to which the weights are attached is hereinafter referred to as the weighted cable portion 21, 21'.

From FIGS. 1a and 2a it can readily be seen that in operation when the cable 10 is being towed and under towing tension, the entire cable including the hydrophones 12, 12' will move through the water 24 approximately adjacent the surface 22 of the water because the inherent drag of the cable 10 and the segments 14, 14' will keep the entire cable length under tension and thus support the bare or sinkable cable sections 20, 20' between the cable sections encased by the floatable cable covering segments 14, 14'. However, when the tow ship stops, the tension will be removed from the cable and it will readily be apparent from FIG. 2b that the weight of the bare cable and hydrophones 12, 12' will cause the sinkable sections 20, 20' of the cable 10 to sink below the surface 22 of the water 24. The hydrophones will sink to a depth approximately equal to the length of the cable portion extending between the floatable cable cover segments 14, 14' and the hydrophones 12, 12' and cause these cable portions to hang downwardly from the surface in a substantially vertical attitude. Thus the hydrophones 12, 12' will be suspended from the surface by the vertical cable portions 28, 28' of the sinkable cable sections 20, 20'.

A unitary hydrophone suspension system of the type described above will satisfactorily suspend hydrophone groups at a predetermined depth below the surface of the water. However, such a system will not be as satisfactory in many applications as a system which contains an additional mechanical filter system for isolating the hydrophones from surface noise signals. Typical surface noise signals include the noises generated by the slapping and pounding of the floating portion of the cable on the waves. Therefore, an additional mechanical filter or a mechanical filtering system may be interposed between the hydrophones and the cable floating at the surface and yet be an integral part of the unitary cable suspension system by means of the unique structure disclosed below.

An embodiment incorporating such a filter is shown in FIGS. 3a and 3b. In this embodiment, fully buoyant waterproof buoyant elements 16, 16' are integrated within the cable immediately adjacent the hydrophones. Each buoyant element 16, 16' has a positive buoyancy and is designed to be fully waterproof and substantially incompressible at depths within the depth zone for which the hydrophone is adapted to operate. They may be of a generally rigid construction or contain pressurized gas inside. They may, however, also be formed of non-rigid fully waterproof and substantially incompressible structures. These buoyant elements 16, 16' should also be chosen to be of such size and shape that they will present little drag resistance and will not interfere with the reeling of the cable aboard ship. In an illustrative embodiment of the present invention, as shown in FIG. 6, a waterproof double-wall stainless steel cylinder 15, either empty or filled with a non-absorptive plastic foam, may be used. The space enclosed by the double wall will determine the buoyant force exerted by the buoyant element. The cable passes axially through the center of the cylinder and streamlined resilient rubber or plastic caps 17, with stainless steel clamps 19 around their ends, hold the caps 17 and the cylinder 19 together and in place on the cable 10.

When such buoyant elements are used adjacent the hydrophones on the sinkable cable sections, the weight of the cable and hydrophones generally provides an insufficient negative buoyancy to overcome the positive buoyancy of the buoyant element. Therefore, it is necessary to add weights 18, 18' as described above.

From FIG. 3b it can readily be seen that in operation the towing tension is removed, the hydrophone and the weighted sinkable cable section will sink below the surface and the flotation covered sections of the cable will float at the surface. The weighted cable portion 21, 21', to which the weights 18, 18' are affixed, will be suspended from the surface by the substantially vertical cable portions 28, 28' of the sinkable cable sections 20, 20'.

In practice a slight amount of the flexible cable covering 14, 14' is pulled beneath the surface of the water and thus the weighted cable portion 21, 21' sinks to a slightly greater depth than the length of the vertical portions 28, 28' of the sinkable cable section 20, 20'. On the other hand, the incompressible buoyancy means, as for example the incompressible floats 16, 16', tend to lift the hydrophones 12, 12' and the portion 30, 30' of the sinkable cable section 20' between the weighted cable section 21, 21' and the hydrophones 12, 12' toward the surface. Therefore, these cable portions 30, 30' of sinkable cable section 20' hold the hydrophones 12, 12' at an equilibrium depth above the cable weights 18, 18'. This combination of weights 18, 18' and buoyant elements 16 represents a well-damped, low-pass mechanical filter or averaging network which effectively serves to isolate the hydrophones 12, 12' from the surface wave motion which comprises the principal source of noise in systems of the present type.

It is desirable to use fully waterproof substantially incompressible buoyant elements 16, 16', which are generally of rigid construction, adjacent the hydrophones while using a soft flexible buoyant material for those portions of the cable which will float at the surface. This is, of course, more complicated and expensive than employing a single cable covering of the soft flexible type which would extend along the entire length of the cable. However, when the hydrophones are to be suspended more than 10 or 15 feet below the surface, this single cable covering construction proves unsatisfactory. Tests were made using soft flexible sponge type continuous covering and weights incorporated into a cable so that portions of the cable would sink when towing strain was removed. The hydrophones were to be suspended 50 feet below the surface. Sinking was to be stopped automatically when a sufficient amount of sponge rubber float material was drawn beneath the surface of the water so that the submerged portion of the cable had a net weight in water small enough to be supported by the adjacent floating cable. As was pointed out above this soft spongy material was desirable for making the floating portion of the cable conform to the shape of surface waves in order to reduce interfering surface noise signals caused by cable slap on the crests and troughs of the waves. Unfortunately, soft, spongy, pliable materials such as sponge rubber tend to be highly compressible. Thus, if the material becomes somewhat waterlogged as it frequently does, and if not enough weight is removed to compensate for the waterlogging, the hydrophones may continue to sink, pulling down additional float cable covering. As the sponge reaches a depth of 15 to 30 feet, it becomes compressed and loses buoyancy at an ever increasing rate, so that in a short time the entire cable could sink. The cable may then be damaged by contact with the bottom or lost if the water is deep. For work on which the hydrophones are to be suspended at substantial depths, this type of test revealed the necessity for a new type of unitary cable suitable for hydrophone operation at great depths. This need led to the invention of a unitary cable in which the soft flexible sponge flotation covering is eliminated on those portions of the cable which are to be used some distance below the surface of the water. Discrete flotation elements characterized by waterproof substantially incompressible construction and also by the short length necessary for cable reeling are substituted for the soft flexible sponge flotation in those portions of the cable used in mechanical filter systems intended to isolate the hydrophones from surface noise.

In operation the segmented flexible cable covering 14, 14' of this embodiment remains adjacent the surface of the water and therefore is never in the depth zone 40 in which the hydrophones are operated. The hydrophone suspension depth zone 40 for which this type of unitary cable is necessary ranges from 10 to 50 feet below the surface of the water at the present time and in the future even greater depths of operation may be necessary.

In cases where the surface noise is small in comparison to the sound detected, such mechanical filters are not necessary. Thus the buoyant elements 16, 16' and sometimes the weights 18, 18' may be eliminated so that the suspension system is comprised of only the cable 10, the hydrophones 12, 12' and the floatable cable covering segment 14, 14'. The weight of the bare cable sections 20, 20' plus the hydrophones is sufficient to sink the hydrophones 12, 12' when towing tension is released and suspend them from the floating cable sections 26, 26' encased by the flotable cable covering segments 14, 14' by the vertical cable portion 28, 28'. See for example the embodiment shown in FIGS. 2*a* and 2*b*.

In other cases the detected signal leevl is so low that the extreme isolation of the hydrophones 12, 12' from the surface noise is required. In such cases another embodiment of the present invention may be used which forms several mechanical filter sections between the hydrophones and the surface noise. As may be seen from FIGS. 4*a* and 4*b*, additional weights 32, 32' and additional buoyant elements 29, 29' are added between the hydrophones 12, 12' and the floatable cable covering segment 14, 14'. Thus the sinkable cable section 20, 20' forms a series of mechanical filter sections leading from the surface to the hydrophones 12, 12', each comprised of a weighted cable portion 36 and a buoyant cable portion 38, as shown in FIG. 4*c*.

It is not possible to substitute a non-compressible float material for the soft sponge rubber or other soft flexible material because it is very necessary that the floating portion of the cable flex so as to conform to surface waves instead of pounding across them in order to keep surface noise down at a level which would provide useable hydrophone detected information. A flexible flotation covering is also necessary to allow reeling the cable off and on the towing ship. While a small amount of material at the ends of each flotation covering section 14, 14' in the present embodiment of the present invention is dragged below the surface by the weight of the sinkable cable sections 20, 20', the depth of immersion is not enough to cause significant hydrostatic compression effects. The buoyant elements 16, 16' attached to the cable 10 adjacent the hydrophones 12, 12' and the additional buoyant elements 29, 29' are made of fully waterproof, preferably rigid material not subject to compression at the depths at which the hydrophones operate. However, unlike the pliable flotation covering segments 14, 14', these substantially incompressible buoyant elements are use only for depth control and noise reduction. They are not necessary to keep the entire system from sinking, as the floatable covering 14, 14' is designed to do this without the aid of the additional positive buoyancy of these elements 16, 16'.

It is to be understood that the above described arrangements are illustrative of the application of the principles of the invention. Numerous other arrangements within the scope of the invention may be devised by those skilled in the art. Thus, by way of example and not of limitation, the hydrophone cable may be completely enclosed with flotation material which is then stripped off to leave bare cable, or the flotation material may be attached to the cable in segments. The weight and rigid floats may be varied as to number and arrangement or may be eliminated entirely for some applications. Two or more hydrophones comprising a hydrophone group may be spaced by flotation elements and/or weights in a submerged section between buoyant sections of cable covered with the flotation sponge layer. The flotation material used in the covering may be sponge rubber or plastic foam or a hollow tube filled with air or other medium. The flexible flotation covering of the cable may be made waterproof by the application of a suitable resilient outer film to the covering; and the flotation elements which are part of the filters may also be formed by applying suitable heavier coatings of epoxy material, for example, to sections of the cellular resilient outer covering. The system may be adapted to suspend objects other than hydrophones and may be used in fluids other than water for purposes other than marine surveying. Accordingly, from the foregoing, it is evident that various changes may be made in the present invention without departing from the spirit of the invention as defined in the appended claim.

What is claimed is:

A unitary hydrophone suspension system for suspending hydrophones in fluid comprising:

a unitary cable having a negative buoyancy;

means including a plurality of hydrophones and weights physically integrated wtih said cable for increasing the negative buoyancy at selected sinkable portions of said cable;

means including discrete floatable covering segments encasing said cable and spaced from said hydrophones so as to give the entire system a net positive buoyancy sufficient to float the remainder of said cable at the surface while suspending the sinkable cable portions at a preselected depth below the surface;

means including at least one fully waterproof non-absorptive buoyant element associated with each hydrophone to give the combination of hydrophone, buoyant element and integral piece of cable a positive buoyancy sufficient to hold the combination at a substantially lesser depth than the depth of suspension of the remainder of the selected sinkable cable portion on which the combination is located; and mechanical means, including additional fully waterproof non-absorptive buoyant elements and weights alternatively disposed along each of said sinkable cable portions and integrally connected thereto to support said hydrophones below the surface of the fluid and filter out surface noise before it reaches the hydrophones.

References Cited by the Examiner
UNITED STATES PATENTS

| | | | |
|---|---|---|---|
| 2,570,707 | 10/1951 | Parr | 340—7 |
| 2,610,240 | 9/1952 | Pottorf | 340—7 |

CHESTER L. JUSTUS, *Primary Examiner.*

J. P. MORRIS, *Assistant Examiner.*